United States Patent [19]

Gaicki

[11] 3,719,862

[45] March 6, 1973

[54] FLEXIBLE CONTACT MEMBERS FOR USE IN HIGH POWER ELECTRICAL DEVICES INCLUDING A PLURALITY OF SEMICONDUCTOR UNITS

[75] Inventor: Stanley Gaicki, Tempe, Ariz.

[73] Assignee: Motorola, Inc., Franklin Park, Ill.

[22] Filed: March 15, 1972

[21] Appl. No.: 234,765

[52] U.S. Cl.........317/234 R, 317/234 A, 317/234 H, 317/234 N, 29/289, 339/258 A

[51] Int. Cl...............................H01l 3/00, H01l 5/00

[58] Field of Search............317/234, 1, 4, 4.1, 5, 5.4, 317/6, 41.1; 29/588, 589; 339/144, 241, 258, 259

[56] References Cited

UNITED STATES PATENTS

| | | | |
|---|---|---|---|
| 3,142,000 | 7/1964 | Bernstein | 317/234 |
| 3,375,415 | 3/1968 | Finn | 317/234 |
| 3,483,444 | 12/1969 | Parrish | 317/234 |

*Primary Examiner*—John W. Huckert
*Assistant Examiner*—Andrew J. James
*Attorney*—Foorman L. Mueller et al.

[57] ABSTRACT

The invention is embodied in a one-piece connecting and assembly member wherein electrical contact is made by flexible contact portions on the member between one end of each of a plurality of fragile semiconductor units and a separate rigid contact member in a high power rectifier or the like. This contact is accomplished while protecting the semiconductor units from physical stresses which could otherwise be applied to them during manufacture and during thermal expansion and contraction of a high power device employing the semiconductor units. The flexible connecting and assembly member includes a cup-shaped portion having an opening for mating with one end of a rigid connecting stud in the high power device and a plurality of contacting fingers extending between the cup-shaped portion and each of the semiconductor units. Each of the fingers is comprised of a U-shaped portion, having first and second integral legs which extend generally in opposite directions along the axis of the cup-shaped portion and a shaped contacting portion. Furthermore, an additional contacting finger may be formed from the bottom of the cup-shaped portion for making electrical contact to an additional semiconductor unit. The use of the connecting and assembly member facilitates the manufacture of high power heat generating semiconductor devices, and in the ultimate use of such devices accommodates changes in temperature and the expansion and contraction of the devices utilizing such member.

11 Claims, 8 Drawing Figures

FLEXIBLE CONTACT MEMBERS FOR USE IN HIGH POWER ELECTRICAL DEVICES INCLUDING A PLURALITY OF SEMICONDUCTOR UNITS

BACKGROUND OF THE INVENTION

Only a few different kinds of housing structures have been developed for incorporating therein a plurality of semiconductor units which give off large quantities of heat during operation in a single device in the housing structure. Dissipation of heat generated in a high power rectifier is one of the most important problems to be solved in such devices. Furthermore, because high power is either developed or accommodated in such devices, it is necessary to have rugged efficient electrical conductors in the device. One commonly used assembly in a rugged housing includes a first rigid, stud mountable contactor for making direct electrical and physical contact with a first terminal of each semiconductor device and a second rigid contactor for making electrical and physical contact to a second terminal of each semiconductor unit. Thus, the two contactors connect a plurality of semiconductor units in parallel. Moreover, a flexible cable is often connected to one of the contactors. A portion of the flexible cable, the rigid contactors and the plurality of semiconductor devices are then encased in a housing which tends to hold them in a spaced relationship with respect to each other. Another portion of the flexible cable extends from the housing.

This prior art structure has disadvantages in some applications because of the complications of manufacture of the composite device and the expense of the flexible cable. Complicated and expensive jigging assemblies are required to properly align the parts of the device while protecting the fragile semiconductor units during assembly. Furthermore, if the semiconductor units are not of precisely the same vertical dimensions, either or both of the rigid contactors sometimes fail to make connection with the shortest of the semiconductor units sandwiched therebetween. Also, heat generated by the semiconductor devices can cause the metal contactors and other parts of the assembly within the housing to expand and thereby subject the fragile semiconductor units to physical stresses which may permanently damage them.

Moreover, some prior art assemblies of semiconductors and connectors are either not suitable for being included in housings of standard outline or they do not allow disassembly to facilitate salvage of good parts if testing during manfacture indicates that the composite device is defective. Additionally, some prior assemblies do not permit cleaning after the semiconductor units are soldered to the contacting members. As a result, materials which would otherwise be removed by washing, for instance, may give off gases within the device which ultimately impair its operation.

SUMMARY OF THE INVENTION

One object of this invention is to provide an economical flexible contact member for use in a standard outline housing for a high power device which contact member is suitable for electrically connecting the terminals at one end of a plurality of individual, solid state units to a common rigid contact in the housing.

Another object is to provide a flexible contact member for an assembly including a plurality of semiconductor units which facilitates self jigging with a connector stud in a high power semiconductor device.

Still another object is to provide a flexible contact member for use in a housing assembly which includes a plurality of semiconductor units that generate large quantities of heat and which is able to absorb thermally create mechanical stresses without transmitting them to the semiconductor units.

A further object is to provide a flexible contact member for making electrical connection between a connector stud and a plurality of fragile diodes in a high power semiconductor device and which is able to absorb forces applied thereto when a cap is crimped onto the connector stud.

The invention relates to a flexible contact member suitable for use in a high power electrical device which includes a plurality of semiconductor units each of which have first and second end terminals. Also included in the electrical device are a first rigid contacting member which connects all of the first end terminals of the semiconductor units together, a second rigid contacting member, and a housing member for holding the first and second rigid contacting members in a fixed relation with respect to each other while providing electrical isolation between them.

The flexible contact member of this invention provides an electrical connection between a rigid connecting stud which is connected to the second rigid contacting member and all of the second end terminals of the semiconductor units, and consists of an open cup-shaped portion centrally of and integral with a plurality of laterally extending flexible fingers. The opening of the cup-shaped portion extends in a direction toward the second rigid contacting member and has an inside surface which is adapted for mating with the connecting stud to properly align the flexible contact member, the stud, the second rigid contacting member with each other and with the housing members. Moreover, each of the flexible fingers includes a U-shaped portion having a first leg which extends from the rim of the cup-shaped portion of one direction along the axis thereof and a second leg which extends from the first leg in a generally opposite direction along the axis of the cup-shaped portion. Integral contacting portions extend in radial directions with respect to the center of the circular closing portion of the cup-shaped portion from the second legs of the flexible contact member.

DETAILED DESCRIPTION OF THE PREFERRED EMBODIMENT

Figures 1, 2, 3, 4:
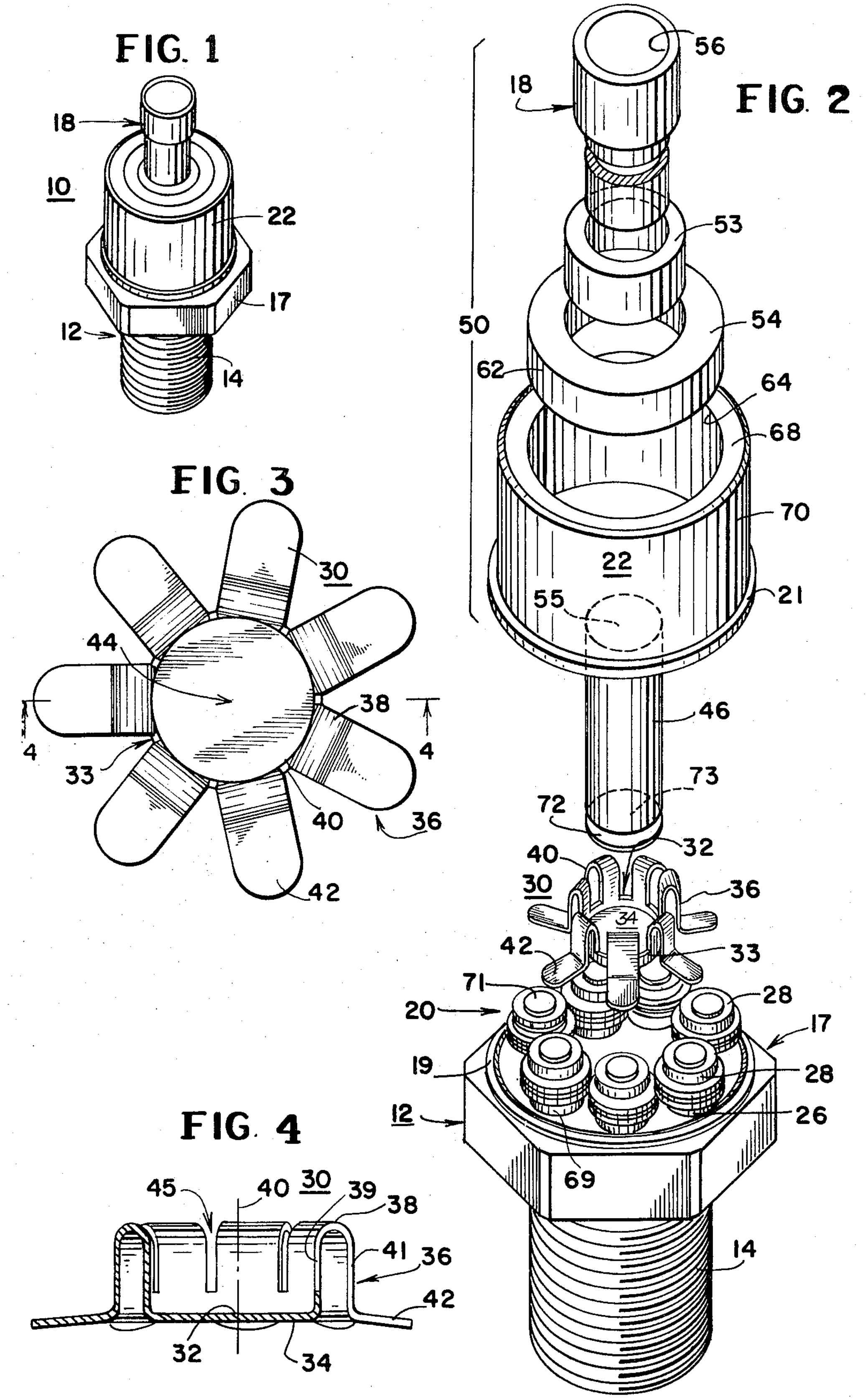
FIG. 1 is an approximately full scale view of a housing having a standard so called DO–9 outline.
FIG. 2 is an enlarged, exploded view of an assembly of parts for a composite, high power electrical device which includes a flexible contact member of the present invention.
FIG. 3 is an enlarged, top view of the flexible contact member shown in FIG. 2.
FIG. 4 is a section view taken along lines 4—4 of the flexible contact member of FIG. 3.

In order to lay a foundation for explaining the structure and operation of the flexible contact member of the present invention, a composite device assembly including the flexible contact member will first be described. FIG. 1 illustrates a housing 10 having a standard outline which is designated as a "DO-9" by the National Electrical Manufacturer's Association. This is the housing for a high power electrical device such as a high current solid state rectifier or a high power zener diode. A stud mountable first contacting member 12 forms a cathode or negative terminal, and includes a threaded stud 14 adapted to be mounted to a heat sink or other structure. The hexagonally arranged flange 17 of member 12 facilitates tightening of the mount. Cylindrical contacting member 18 forms an anode or positive terminal.

FIG. 2 is an enlarged, exploded view of the assembled device of FIG. 1 illustrating the relationship of the various individual parts which may be combined within the housing 10. The rigid cathode contacting member 12 is comprised of a material such as oxygen free hard copper which has high electrical and high thermal conductivities. An upwardly extending circumferential restraining member and weld ring 19 is formed from steel and located on flange 17. Member 19 has an inside diameter suitable for guiding within flange 17 the arrangement of a plurality of semiconductor units 20, which may be high current rectifiers, or zener diodes having high power dissipation requirements. The top surface of restraining member 19 receives the lower end 21 of the upwardly extending hollow cylindrical weld member 22. The end portion 21 forms another weld ring for being welded to weld ring 19.

Each semiconductor unit 20 has a first end terminal 26 and a second end terminal 28. The semiconductor units are arranged in a circular configuration abutting against the inside surface of the weld ring 19 and against one another so that terminals 26 and 28 form circles which lie in parallel spaced apart planes.

The flexible contact member 30 of the present invention, which is shown in FIGS. 2, 3 and 4, is made of a single piece of resilient material, such as soft annealed copper having a thickness on the order of 16 mils. It includes a portion 32 shaped generally in the form of a shallow cup having a hollow cylinder 33 with a circular bottom portion or closing member 34. The portion 34 lies generally in a plane parallel to the plane of terminals 28 of the semiconductor devices 20. Finger portions 36 of the flexible contact member 30 are integral with the open end of the cup-shaped portion 32 and extend from points equally spaced around the circumference thereof. Each of the fingers 36 includes a U-shaped portion 38 (FIG. 4) having one leg 39 extending in a direction generally perpendicular to the plane of the bottom portion 34 and parallel to axis 40 of cylindrical portion 33. A second leg 41 is integral with and extends from first leg 39 in an opposite direction parallel to the axis of cylinder 33. Furthermore, shaped contacting portions 42 are integral with and extend from each of legs 41. Portions 42 may lie either in the plane of closing member 34 or in a plane which is generally parallel to the plane of closing member 34. Alternatively, portions 42 may be bent slightly downward to form an angle on the order of a few degrees with a plane parallel to the plane of bottom portion 34. As shown in FIG. 3, contacting portions 42 extend radially with respect to the center 44 of the circular closing member of cup-shaped portion 32. As shown in FIG. 4, slots 45 are provided between each of U-shaped portions 38. Flexible contact member 30 may be formed from a single blank of soft copper having a thickness on the order of 16 mils.

Figure 5:
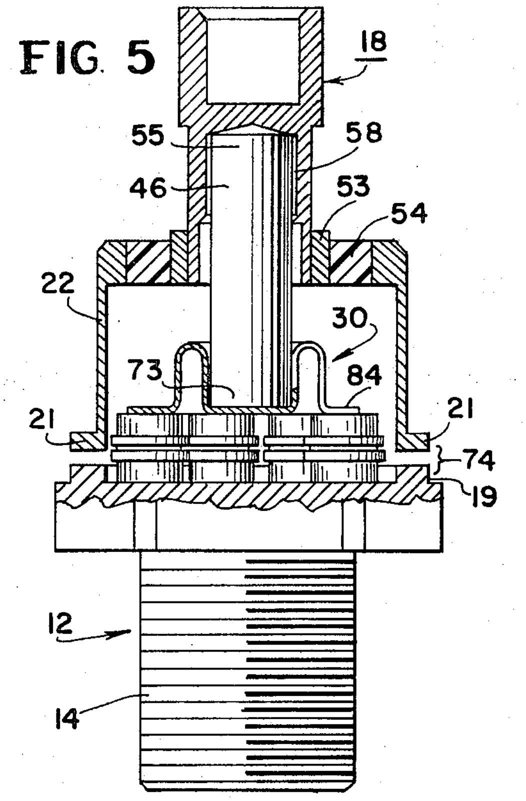
FIG. 5 is a partially sectioned view of the composite device of FIG. 2 wherein the weld rings thereof are separated by a predetermined amount in response to the flexible contact member being in an extended position.

The upper portion of the housing structure for the device of FIG. 1, includes a connector stud 46 (FIG. 2) of oxygen free hard copper shaped in the form of a solid cylinder. The cap assembly for the housing includes the assembly which is designated 50 in FIG. 2, and it consists of an anode contacting member 18, a bushing 53, a glass insulating sleeve 54 and weld member 22. The rigid anode contacting member 18 may be formed from a conductive material such as oxygen free hard copper or from steel. A first socket 56 is provided in the assembly at one end of member 18 for receiving a standard flex lead connector. A second socket 58 shown in the cross-section of FIG. 5 is provided in the lower portion of member 18 for receiving and making contact with end 55 of connector stud 46. Portions of anode contacting member 18 interlock with bushing 53 which is embedded in glass insulating sleeve 54. Bushing 53 has a temperature coefficient of expansion on the same order of magnitude as glass sleeve 54. The outside surface 62 of the glass insulating sleeve 54 joins the inside surface 64 of the circular top portion 68 of the weld member 22. The cylindrical wall 70 of the weld member 22 is integral with and connects top portion 68 with weld ring 21. The cylindrical wall 70 houses diodes 20, flexible contact member 30, and the lower portion of connector stud 46, as shown in FIG. 5.

During assembly, a first set of solder preforms 69, as indicated in FIG. 2, are placed on the mounting surface of contacting member 12 near weld ring 19. Next, terminals 26 of semiconductor units 20 are placed on the solder preforms 69 with the housing of the units 20 in an abutting relation. A second set of solder preforms 71 are then placed on top of terminals 28 of each of semiconductor units 20. Shaped contactor portions 42 of the flexible contacting member 30 are positioned on each of solder preforms 71. A solder preform 72 which may be somewhat larger than solder preforms 69 and 71 is placed on the top surface of closing member 34 of flexible contact member 30, and end 73 of the connector stud 46 is placed in mating engagement with cup-shaped portion 32 on top of solder preform 72. Alternatively, the contacting surfaces of flexible contact member 30 can be "pre-tinned" with solder instead of using solder preforms 71 and 72.

A simple holding jig may be utilized to accomplish the above mentioned assembly steps because the parts of the composite device are essentially self jigging. More particularly, weld ring 19 locates semiconductor units 20 in a proper spaced relation. Also, the cup-shaped portion 32 of flexible contact member 30 aligns the connecting stud 46 so that its end 55 can be placed in mating engagement with socket 58 of member 18, as shown in FIG. 5.

After the device is fabricated to the extent described above, i.e., before the end assembly identified by the reference character 50 in FIG. 2 is placed in position, the partially assembled device is placed in a furnace which simultaneously melts solder preforms 69, 71 and 72 to electrically connect that partially completed assembly together. After the solder has set and the partial assembly has been removed from the furnace, all of the parts thereof are cleaned to remove soldering resins and other materials. If these materials were allowed to remain in the device after the cap is sealed, they might give off gases of otherwise have harmful effects on the complete device.

Next, electrical tests are preformed on the partially assembled structure to discover whether it will operate within its specifications. If the soldering operation has caused the electrical characteristics of one of the individual semiconductor units to change or if some other fault is discovered during testing, the partially assembled soldered structure can readily be disassembled by returning it to the surface and pulling it apart while the solder is in a molten state. The structure can then be repaired or the parts thereof can be salvaged without destroying an entire completed device 10, thereby decreasing the overall expense of manufacture.

Figure 6:
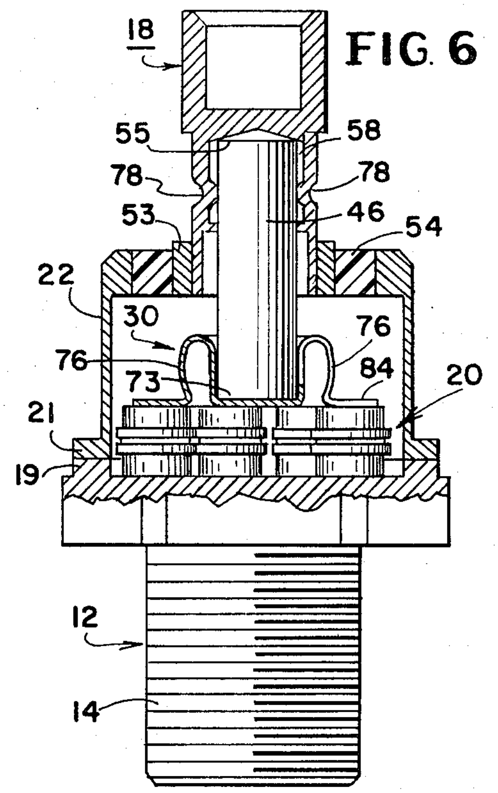
FIG. 6 is another cross-sectional drawing of the composite device which is similar to the view shown in FIG. 5 but wherein the weld rings thereof are welded together and wherein the cap is crimped to the connector stud.

If the partial assembly satisfactorily passes electrical tests, it is placed in a welding fixture and the upper assembly as previously described is aligned as shown in FIG. 5, and the end 55 of connector stud 46 is placed in mating engagement with socket 58 provided in anode connecting member 18. The dimensions of the flexible contacting member 30, the connector stud 46 and the parts of assembly 50 are chosen such that the flexible member, when in its extended position holds weld ring 21 of weld member 22 a predetermined distance away from weld ring 19, as shown in FIG. 5. A welding fixture (not shown) applies pushing forces to the bottom surface of cathode contacting member 12 and to the top surface of anode contacting member 18 to force the two contacting members toward each other until the bottom surface of weld ring 21 abuts against the top surface of weld ring 19. This applies a compressive force to flexible contact member 30 of a magnitude predetermined by gap 74, of FIG. 5. In response to this predetermined force, member 30 deforms as shown at points 76 of FIG. 6 thereby absorbing some of the compressive force. The rest of the compressive force is distributed by fingers 36 to each of semiconductor units 20. Flexible contact member 30 is designed such that said compressive force applied to each semiconductor unit when gap 74 is closed, is less than 5 pounds.

With the two assemblies maintained under pressure by the welding fixture, weld ring 21 is welded to weld ring 19 to hermetically seal the two portions of the housing around the units 20.

Finally, the side wall of anode contacting member 18 is crimped at points 78 against end 55 of connector stud 46 to form an electrical and mechanical connection therebetween. The crimping force may tend to deflect end 73 of connector stud 46 sideways. Flexible contact member 30 is designed to absorb and store this movement of end 76 of connector stud 46 as potential mechanical energy to thereby protect fragile semiconductor units 20. As is apparent from FIGS. 5 and 6, because of the shape of flexible member 30, semiconductor units 20 having substantially greater heights could be accommodated within the housing portion 22 by shortening connecting stud 46. That is, with the member 30 of the present invention, there is greater tolerance in accommodating differences in the actual dimensions of the units 20 to thereby help to reduce overall manufacturing costs and improve the yields in acceptable devices from the complete manufacturing operation.

In operation, because of the voltage drop across semiconductor units 20 and the currents flowing through them, large amounts of heat are generated within the composite electrical device. As a result, the parts of the composite electrical device tend to expand and elongate. As connector stud 46 increases in length with respect to portion 70 of weld member 22, the compressive force applied to flexible contact member 30 increases and is mostly absorbed by additional flexure of the curved portions of flexible contact member 30. The elongation with temperature of legs 39 and 41 of the legs of "U-shaped" portion 38 tend to cancel each other out, and therefore, do not result in increased force being applied to semiconductor units 20. Moreover, if the connector stud 46 decreases in length with respect to the length of the cylindrical portion 70 of the weld member 22, flexible contact member 30 tends to restore itself to the normal extended position thereby tending to maintain electrical and mechanical contact between connector stud 46 and semiconductor units 20. As a result, there is no excessive stress applied to the solder joints between end 73 of connector stud 46 and the top surface of closing member 35 of cup-shaped portion 32. Otherwise, the electrical current path through the composite device might be broken because the resulting tensile stresses could result in the separation of the solder connections.

Figure 7:
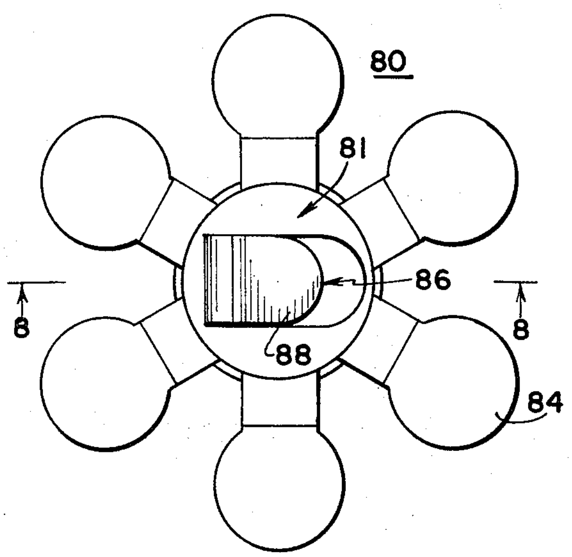
FIG. 7 is a top view of an alternative configuration of the flexible contact member for use in the assembly of FIG. 2 and which includes an additional contacting finger.
Figure 8:
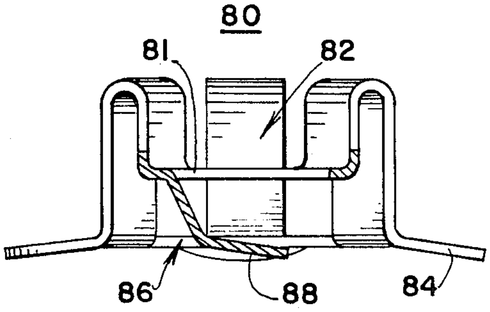
FIG. 8 is a section view of the flexible contact member of FIG. 7 which is taken along line 8—8.

FIG. 7 illustrates a top view of a flexible contact member 80 having an alternative configuration and which performs a function similar to that performed by a flexible contact member 30. As shown in FIG. 8, the bottom or closing member 81 of cup 82 of flexible contactor 80 lies in a plane which is parallel to the plane of shaped semiconductor unit contacting portions 84. Furthermore, an additional center finger 86 is formed by stamping and shaping a portion of closing member 81. Generally L-shaped finger 86 includes a contacting portion 88 for making contact with an additional semiconductor unit placed near the center of the mounting surface on cathode contacting member 12 to thereby enable more semiconductor units to be included in the composite device. Furthermore, contacting portions 84 of flexible contacting member 80 may have a generally circular configuration as shown in FIG. 7.

Dimensions relating to flexible member 30 are as follows:

| | |
|---|---|
| Height of member 33 | 0.200 inch |
| Diameter of circular closing portion 34 | 0.337 inch |
| Diameter of circle formed by the centers of the curved portions of contacting members 42 | 0.690 inch |
| Width of fingers 36 | 0.136 inch |
| Thickness of flexible member 30 | 0.016 inch |

The present invention provides therefore, a flexible contact member for use in an assembly that includes a plurality of paralleled semiconductor units which tend to give off a great deal of heat during operation. The flexible contact member acts to self jig a connecting stud, or vice versa, and it absorbs mechanical forces which otherwise would be transmitted to the fragile semiconductor units. Moreover, the flexible contact member is shaped so that its expansion with temperature is self balancing. The structure and function of the invention in turn facilitates manufacture by greater tolerances in fitting the sensitive parts of the high power device together, and better accommodates the heat generated in operation than the devices of the prior art.

I claim:

1. In a high power electrical device having a plurality of semiconductor units each of which have a first end terminal and a second end terminal, a first rigid contacting member connecting all of the first end terminals together, a second rigid contacting member, housing means for holding the first and second rigid contacting members in a fixed relation, and a flexible contact member providing an electrical connection between the second contacting member and all of the second end terminals of the semiconductor units,
said flexible contact member including:
a cup-shaped portion closed at the bottom and open at the top, with the open top accepting the second contacting member therein and having an inside surface of the cup-shaped portion mating with the second contacting member to properly align said flexible contact member and the second contacting member with each other and with the housing means; and
a plurality of flexible fingers extending from said flexible contact member adjacent the cup-shaped portion and each of said fingers having a contacting portion in electrical contact with one of the second end terminals of the semiconductor units so that said flexible contact member provides an electrical connection between all of the second end terminals and the second contacting member.

2. The device as defined in claim 1 wherein:
said cup-shaped portion being closed at one end by a circular closing portion, said closing portion lying in a plane perpendicular to the axis of said cylindrical portion;
each of said fingers having two integral legs formed in a U-shaped, one of said legs extending from said cylindrical portion in one direction generally parallel to said axis thereof, the other of said legs extending from said one of said legs generally in the opposite direction parallel to said axis; and
said contacting portions of said fingers lying in a plane generally parallel to the plane of said closing portion and extending from the other of said legs in radial directions with respect to the center of said circular closing portion.

3. The device as defined in claim 2 wherein said contacting portions of said fingers lie in a plane parallel to and located beneath said plane of said closing portion and said flexible contact member further includes another finger portion extending from said closing portion and having another contacting portion lying generally in the same plane as said other contacting portions.

4. The combination of claim 3 wherein said fingers and said cup-shaped portions are integral with each other and formed from a single piece of copper.

5. In an electrical assembly having a first contacting member with a supporting surface thereon, a plurality of individual semiconductor units which give off large quantities of heat and which have first end terminals located on the supporting surface, and which have second end terminals, a second contacting member having a first contacting surface, and housing members holding said first and second contacting members in a spaced relation and one of the housing members providing an insulating portion located between the first and second contacting members to provide electrical isolation therebetween, and said electrical assembly having a connecting assembly, said connecting assembly including:
rigid contacting means having a second contacting surface abutting against the first contacting surface of the second contacting member and a third contacting surface; and
one-piece flexible contacting means having a cup-shaped portion placed in mating engagement with said third contacting surface of said rigid contacting means and a plurality of flexible fingers extending in lateral directions from said cup-shaped portion, and each of said fingers having a selectively shaped portion for making electrical connection to the second end terminals of each of the individual semiconductor units.

6. The connecting assembly defined in claim 5 wherein said rigid contacting means includes a solid cylindrical conductive member.

7. The connecting assembly defined in claim 5 wherein:
said cup-shaped portion of said flexible contacting means has a generally circular cross-section which is closed at one end by a circular closing portion and open at its other end;
each of said fingers includes a U-shaped portion having first and second legs, said first leg extending from said open end of said cup in a direction generally perpendicular to the plane of said circular closing portion, said second leg extending from said first leg portion in the direction opposite to said first leg portion; and
said selectively shaped portions of each of said fingers extending from said second legs in a radial direction from the center of said circular closing portion.

8. The connecting assembly defined in claim 7 wherein said fingers and said cup-shaped member are integral with each other and formed from a single shaped piece of soft copper having a thickness on the order of 16 thousandths of an inch.

9. The connecting assembly defined in claim 8 having an additional finger extending from said circular closing portion of said cup-shaped portion and said additional finger including a further selectively shaped portion lying generally in the same plane as said other selectively shaped portions.

10. The connecting assembly defined in claim 9 wherein said additional finger is formed in a generally L-shaped configuration from a portion of said circular closing portion.

11. In a high power semiconductor device, which generates substantial amounts of heat during the operation thereof, having a plurality of relatively fragile semiconductor units therein, each of which has at least two oppositely disposed terminal portions thereon, housing means for such units, a first electrical connecting means electrically connected to one terminal of each semiconductor unit, a second electrical connecting means for electrical connection to another terminal of each semiconductor unit, and flexible means electrically connecting said second electrical connecting means and said another terminal of each of said plurality of semiconductor units, the flexible means being adapted to accommodate differences in vertical dimensions of said plurality of semiconductor units as well as to accommodate expansion and contraction of the first and said second electrical connecting means upon the changing of the temperature of the device during operation of the device, said flexible means comprising:

a one-piece metal member having a central cup-shaped portion with a closed bottom and defined by a plurality of spring contacts surrounding the cup-shaped portion with said cup-shaped portion accommodating said second electrical connecting means in an electrical connection action;

each of said spring contacts comprising a U-shaped portion with one leg of such latter portion joining the top of the cup-shaped portion and the other leg of the U-shaped portion located outward with respect to said one leg and joining a spring terminal portion extending laterally to the cup-shaped portion; and with each spring contact being flexible and each spring terminal portion being in engagement with said another terminal of a semiconductor unit.

* * * * *